March 2, 1971 R. J. MARTINOVICH 3,567,571
LAMINATED STRUCTURE FOR HOT APPLICATION OF AN IMAGE
TO A THERMOPLASTIC RESIN ARTICLE
Filed Nov. 14, 1967

INVENTOR.
R. J. MARTINOVICH
BY Young & Quigg
ATTORNEYS

United States Patent Office 3,567,571
Patented Mar. 2, 1971

3,567,571
LAMINATED STRUCTURE FOR HOT APPLICATION OF AN IMAGE TO A THERMOPLASTIC RESIN ARTICLE
Robert J. Martinovich, Bartlesville, Okla., assignor to Phillips Petroleum Company
Filed Nov. 14, 1967, Ser. No. 682,775
Int. Cl. B32b 27/10; B44c 1/16
U.S. Cl. 161—206         4 Claims

ABSTRACT OF THE DISCLOSURE

A heat transfer laminated structure for hot application to a thermoplastic resin article is provided, said structure comprising a paper substrate, which may be coated with a resin, a coating of a heat release agent bonded to said substrate, a film of a thermoplastic resin compatible with the resin of said article bonded to the heat release coating, and an image to be transferred imposed on only a portion of the film of resin. The image may be applied either before or after applying the resin film to the release agent on the coated or uncoated substrate. When applying the resin film before application of the image, it is preferred to apply a second resin film over the image to protect the image by sandwiching it between the films of resin. Heat and pressure are used to transfer the image and film or films of resin to the resin article.

---

This invention relates to a structure and process for hot application of an image comprising printed matter, a design, or a decoration to an article formed of thermoplastic resin.

Heat transfer of labels and the like to thermoplastic resin articles has been performed by using one or more polyester layers or films to transfer the image or label to the article. These films of polyesters or polyacrylics have been found to wrinkle and transfer a poor impression of the image when utilized in large sized labels containing a large area of solid copy.

The present invention provides a laminated structure which avoids the use of polyesters and polyacrylics, and utilizes a dimensionally heat stable material not heretofore used in the hot transfer process.

Accordingly, it is an object of the invention to provide a laminated structure for hot transfer of an image to an article made from a thermoplastic resin. Another object is to provide a simple heat transfer process for applying an image to a thermoplastic resin article. A further object is to provide a laminated structure including a label or image, and a process for hot transfer thereof to a thermoplastic resin article without wrinkling of the structure and distortion of the label or image. Other objects of the invention will become apparent to one skilled in the art upon consideration of the accompanying disclosure.

A broad aspect of the invention comprises a heat transfer laminated structure for hot application to a thermoplastic resin article comprising a paper substrate which may be coated with a polyolefin, a coating of release agent bonded to the substrate, a film of a polyolefin compatible with the resin of the article bonded to the heat release coating, and an image to be transferred imposed on only a portion of the film of polyolefin. The polyolefin film is applied either before or after application of the image to the structure. The image as in a printed label, design, picture, etc., is not continuous so that when it is applied directly to the release coat, the polyolefin film is bonded to the release coat in the areas of the image which are open or contain no ink or other decoration.

Figure 1:
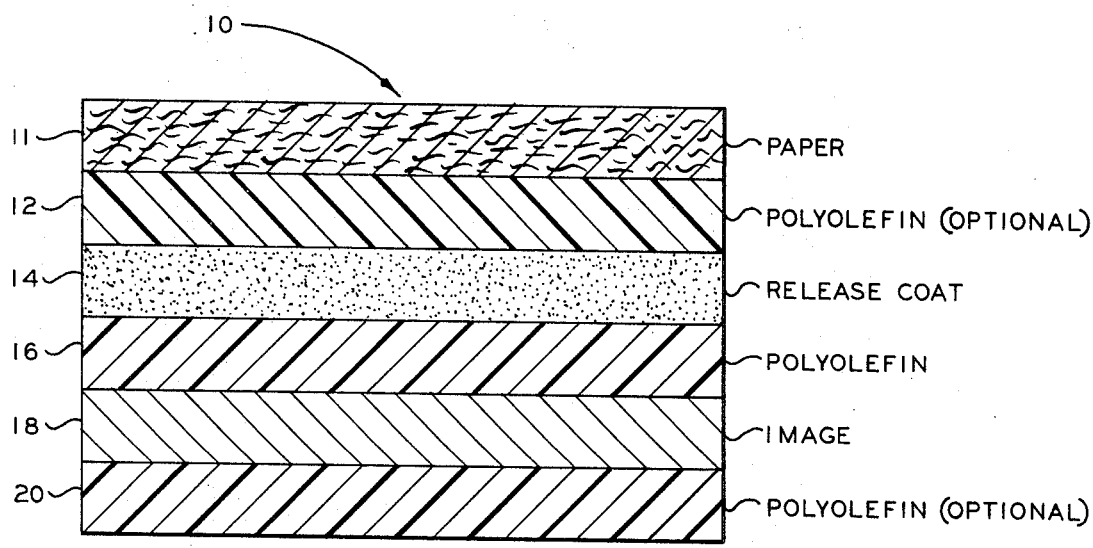
Figure 2:
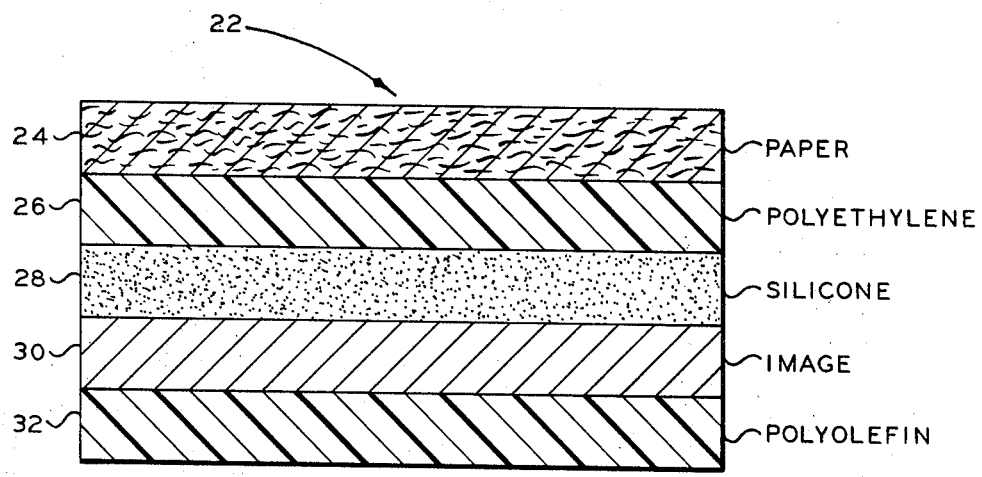

A more complete understanding of the invention may be had by reference to the accompanying schematic drawing of which FIGS. 1 and 2 are transverse cross sections of heat transfer laminates or structures made in accordance with the invention.

Referring to FIG. 1, a paper backing 10 is preferably coated with a polyolefin or other resin coating 12 although this coating may be omitted. A polyethylene coated paper is preferred because of the unique smoothness of the coated surface which enhances the appearance of the transferred image on the thermoplastic resin article. A suitable release agent is coated over the coated or uncoated paper backing to form release coat 14. The preferred release agent is a silicone compound conventionally used for this purpose. Paraffin wax is also utilizable for this purpose. Any heat release coating is operable in the invention. A polyolefin film 16 is applied to the release coat 14 so that it adheres to the release coat but is not strongly bonded thereto. Layer 18 represents an image, label, decoration, design, or printing which is applied directly to the polyolefin film 16 so that it adheres thereto. The image may be imposed on the polyolefin film by any method known in the art such as by printing, overlaying, etc. The image or label 18 is discontinuous so that the second polyolefin film 20 becomes bonded to the first polyolefin film 16 with the image in between upon application of the transfer structure by hot stamping or similar hot transfer means.

The polyolefins used in films 16 and 20 are polymers of $C_2$ to $C_4$ 1-mono-olefins. Both homopolymers and copolymers of these olefins may be utilized. The preferred polymer is polyethylene or a copolymer of ethylene and one or more other olefins of this group or a mixture of the polymers in which polyethylene is the major portion of the mixture. Polyethylene or polypropylene are the preferred coatings on paper backing or substrate 11.

In the application of heat transfer structure 10 to a polyolefin article by hot stamping or similar technique conventional in the art, the structure 10 is placed in the desired location for positioning of the image or label on the resin article with polyethylene film 20 in contact with the article. The simultaneous application of pressure and heat to paper backing 11 bonds polyolefin film 20 directly to the article and polyolefin film 16 in certain restricted areas to the film 20 with the image 18 in between and embedded in the two films of polyolefin. Hot release coat 14 functions at this time to release the coated or uncoated paper backing 11 from polyolefin film 16 so that the backing is removed to complete the transfer operation.

Referring to FIG. 2, the transfer structure 22 is similar to structure 10 of FIG. 1 in that a paper substrate or backing 24 coated with polyethylene (which is optional) is then coated with silicone as a release coat 28 but the image 30 is applied directly to silicone coat 28. After application of the image 30, a film of polyolefin such as polyethylene is laid over the image so that it adheres to the silicone coat in the area not covered by the image.

In applying the structure 22 to resin article by hot stamping or simliar technique, the polyolefin film 32 bonds to the resin with which it is compatible and image 30 is impressed in the polyolefin film. While this laminate 22 is less expensive to prepare, it is not so suitable as laminate 10 because of the fact that the image 30 is not completely coated with polyethylene or similar polymer after being applied to the article.

In FIG. 1, the function of polyolefin film 20 is principally to protect the image 18, such as printing, from distortion on film 16 to which it merely adheres, prior to usage.

In one embodiment of the invention, polyolefin film 20 or film 32 is pigmented of a different color than the article to which the image or label is attached, thus displaying the image on a background of different color from that of the bottle, package, or other resin article to which the image or label is applied. In one application of the invention, a very thin or continuous film of white polyethylene was applied over the image in negative form so that the white film adhered to a transparent film of polyethylene 16 (FIG. 1). The label, a Phillips 66 shield in red and black ink was imprinted in reverse on polyethylene layer 16 before overlaying the image with white polyethylene 20. Upon hot stamping of the transfer laminate to a polyethylene article by placing the laminate 10 with the film 20 on the surface of the article to be decorated and applying heat and pressure to paper substrate 11, film 20 was bonded directly to the article and film 16 was bonded to film 20 and to the shield (image) lying between the films, thereby providing a red and black shield on a white background with portions of the shield showing in white. Other color combinations contrasting with the color of the article to which the label is applied will readily occur to one skilled in the art.

In order to more specifically illustrate the invention, a specific application of the invention follows.

An 80-pound bleached kraft paper coated by an extrusion technique with 0.1 mil thick layer of polyethylene was roller coated with 0.1 mil maximum thickness of a silicone release agent. One sample of this coated paper (including the silicone release agent) was 2-color printed and the printed label or pattern was coated with a 0.1 mil thick film of polyethylene by extrusion. The resulting laminate was applied to a polyethylene article by hot stamping and provided a clear and sharp label firmly bonded to the article, the ink of the label being firmly embedded in the polyethylene of the last applied film.

Another sample of the coated kraft paper containing the silicone release was given a 0.1 mil coat of polyethylene after which it was printed with the desired label and the resulting laminate was applied by hot stamping to a polyethylene article as a label thereon. The resulting label was sharp and clear and the ink in the label was coated with a protective coat of polyethylene.

A third procedure comprises applying a 0.1 mil polyethylene film by extrusion coating or similar technique to the silicone coated craft paper followed by printing on the polyethylene film and applying a second film of polyethylene over the print. In this technique, the print is protected during any interval between the preparation of the laminate and the application thereof by hot stamping or other hot application to the resin article.

In accordance with another technique, a film of polyethylene or other polyolefin 0.1 mil in thickness is printed to apply the desired label thereto and this printed film is applied to the release paper (containing the silicone release agent) by cold roller application. The resulting laminate is then hot stamped to the resin article to be decorated or labeled.

In some applications of the invention, a 40-pound unbleached craft paper coated by extrusion with a thin film of polypropylene was used in the same manner as the 80-pound bleached kraft paper described above. The transfer image was prepared by the silk screen method using red and black subject backed by white ink and then by polyethylene coating.

Certain modifications of the invention will become apparent to those skilled in the art and the illustrative details disclosed are not to be construed as imposing unnecessary limitations on the invention.

I claim:
1. A heat transfer structure for hot application of an image to a thermoplastic resin article comprising in combination.
   (a) a paper substrate;
   (b) a first film of polyolefin resin coating the said paper (a);
   (c) a coating of a silicone release agent bonded to said polyolefin film of (b);
   (d) a second film of a polyolefin resin bonded to said silicone coating of (c);
   (e) an image to be transferred, imposed on only a portion of said polyolefin film and
   (f) a third film of polyolefin resin bonded to said image of (e), said silicone coating of (c) thus being interposed between said polyolefin film (b) and said polyolefin film (d) with said image being interposed between said polyolefin film of (d) and said polyolefin film of (f).

2. The structure of claim 1 wherein the polyolefin resin of (b) is polyethylene.

3. The structure of claim 1 wherein the polyolefin resin of (b) is polypropylene.

4. The structure of claim 1 wherein said films of (b), (d) and (f) are polyethylene.

References Cited
UNITED STATES PATENTS

| | | | |
|---|---|---|---|
| 3,013,917 | 12/1961 | Karlin et al. | 156—240 |
| 3,014,828 | 12/1961 | Reese | 156—240 |
| 2,882,183 | 4/1959 | Bond et al. | 161—406 |
| 2,920,009 | 1/1960 | Humphner | 156—240 |
| 3,007,829 | 11/1961 | Akkeron | 156—240 |
| 3,073,790 | 1/1963 | Bosoni | 117—155U |
| 3,445,309 | 5/1969 | Milliken | 156—240 |

WILLIAM J. VAN BALEN, Primary Examiner

R. J. ROCHE, Assistant Examiner

U.S. Cl. X.R.

156—240; 161—208, 250, 401